United States Patent
Mondello et al.

(10) Patent No.: US 12,197,557 B2
(45) Date of Patent: Jan. 14, 2025

(54) METHOD FOR VALIDATING AN EXTERNAL SOFTWARE MODULE FOR ITS USE BY A SYSTEM-ON-A-CHIP

(71) Applicants: STMicroelectronics S.r.l., Agrate Brianza (IT); STMicroelectronics (Rousset) SAS, Rousset (FR)

(72) Inventors: Antonino Mondello, Messina (IT); Stefano Catalano, Catania (IT); Cyril Pascal, Aix en Provence (FR)

(73) Assignees: STMicroelectronics S.r.l., Agrate Brianza (IT); STMicroelectronics (Rousset) SAS, Rousset (FR)

( * ) Notice: Subject to any disclaimer, the term of this patent is extended or adjusted under 35 U.S.C. 154(b) by 482 days.

(21) Appl. No.: 17/454,231

(22) Filed: Nov. 9, 2021

(65) Prior Publication Data
US 2022/0197990 A1    Jun. 23, 2022

(30) Foreign Application Priority Data
Dec. 21, 2020   (FR) ...................................... 2013782

(51) Int. Cl.
*G06F 21/44* (2013.01)
*G06F 11/10* (2006.01)
*H04L 9/32* (2006.01)

(52) U.S. Cl.
CPC .......... *G06F 21/44* (2013.01); *G06F 11/1004* (2013.01); *H04L 9/3236* (2013.01)

(58) Field of Classification Search
CPC ..... G06F 21/44; G06F 11/1004; H04L 9/3236
See application file for complete search history.

(56) References Cited

U.S. PATENT DOCUMENTS

| | | |
|---|---|---|
| 5,944,821 A | 8/1999 | Angelo |
| 8,001,433 B1 | 8/2011 | Bhatia et al. |
| 2007/0226561 A1 | 9/2007 | Padhye et al. |
| 2008/0276140 A1 | 11/2008 | Gemmeke et al. |
| 2009/0160544 A1 | 6/2009 | Otsuga et al. |
| 2011/0221502 A1 | 9/2011 | Meijer et al. |
| 2015/0082093 A1 | 3/2015 | Sarangi et al. |
| 2015/0378423 A1 | 12/2015 | Hanssen |
| 2017/0109546 A1 | 4/2017 | Nerot |
| 2020/0065480 A1 | 2/2020 | Gu et al. |

(Continued)

FOREIGN PATENT DOCUMENTS

FR      3019347 A1    10/2015

*Primary Examiner* — Ryan J Jakovac
(74) *Attorney, Agent, or Firm* — Slater Matsil, LLP (57) ABSTRACT

According to one aspect, a system-on-a-chip is proposed which includes a memory storage, a computation circuit, a comparison circuit, and a validation circuit. The memory storage is configured to store an external software module. The computation circuit is configured to compute several modified software modules from the external software module and compute check values by iteration until obtaining a final check value. Each check value is computed at least from a given modified software module and a check value previously computed, starting with a predefined initial check value. The comparison circuit is configured to compare the final check value to an expected value stored in the system-on-a-chip. The validation circuit is configured to validate the external software module when the final check value is equal to the expected value.

20 Claims, 4 Drawing Sheets

(56) References Cited

U.S. PATENT DOCUMENTS

2020/0132762 A1    4/2020  Kukreja et al.
2020/0226050 A1*   7/2020  Lyberis ................. G06F 11/323
2022/0066741 A1*   3/2022  Saarinen ............... H04L 9/0631

* cited by examiner

METHOD FOR VALIDATING AN EXTERNAL SOFTWARE MODULE FOR ITS USE BY A SYSTEM-ON-A-CHIP

CROSS-REFERENCE TO RELATED APPLICATIONS

This application claims priority to French Application No. FR 2013782, filed on Dec. 21, 2020, which application is hereby incorporated by reference herein in its entirety.

TECHNICAL FIELD

The present disclosure generally relates to systems on a chip and, in particular embodiments, to validation of external software modules used by systems on a chip.

BACKGROUND

An external software module is a software program (e.g., code, instructions, etc.) not originally provided to the system-on-a-chip but one that can be injected into the system-on-a-chip. The external software module can be used, for example, to implement a service not originally provided to the system-on-a-chip.

For example, for cost reasons, some systems on a chip do not include non-volatile memory, such as flash or ROM memory, to store firmware usable to implement some special tasks. For example, these special tasks can be platform debug, analysis and reconfiguration, or also deep address/failure analysis. It can be advantageous to provide such firmware to the system-on-a-chip after being deployed in the field.

However, for security reasons, it is advantageous for the system-on-a-chip to validate an external software module before implementing it to ensure that the external software module is an authorized software module. To validate an external software module, systems on a chip generally implement complex methods using advanced security services.

In low-cost systems on a chip, however, there may not be any security features, such as cryptographic features, present in hardware or software to implement some advanced secure services. Therefore, for such systems on a chip, there are no features to validate external software modules. Further, in such systems on a chip, there may not be any access to some areas of the system-on-a-chip outside the factory because not all of the secure procedures are made available. It would be advantageous to provide a method to validate and authenticate external software modules for their use by a system-on-a-chip.

SUMMARY

According to one aspect, a method is proposed for validating an external software module for its use by a system-on-a-chip. The method includes the following steps performed by the system-on-a-chip: an obtention of the external software module, computations of several modified software modules from the external software module, an iteration of a computation of a check value until obtaining a final check value, each check value being computed at least from a given modified software module and a check value previously computed, starting with a predefined initial check value, a comparison of the final check value to an expected value stored in the system-on-a-chip, and a validation of the external software module when the final check value is equal to the expected value.

In embodiments, the method includes a computation of a first check value from the initial check value and a modified software module.

In embodiments, the method includes a computation of several check values by iteration, each check value computed from at least one previously computed check value and a modified software module.

In embodiments, the check value computation is iterated a predefined number of times until a final check value is obtained, and the final check value is compared to an expected value. The expected value is defined by the manufacturer of the system-on-a-chip from an authenticated software module.

In embodiments, the expected value is computed in the same way as the final check value from the authenticated software module. If the final check value equals the expected value, the probability that the external software module is the authenticated software module is high, and the external software module is validated for its use by the system-on-a-chip.

The iteration performed for the computation of the final check value allows lowering the probability to validate an external software module that is not an authenticated software module. The method advantageously allows validating an external software module in a simple and secure way.

Low-cost systems on a chip generally include a cyclic redundancy check circuit. In embodiments, each check value is computed by using a cyclic redundancy check algorithm. By using a cyclic and redundancy check module, advantageously, the system-on-a-chip does not require any additional security module. Thus, the method can be implemented on a low-cost system having a cyclic redundancy check circuit.

Alternatively, each check value is computed by using a hash algorithm. In embodiments, each check value is also computed by using a length of the external software module. The use of the length of the external software module for computing the check value advantageously adds more robustness to the method. Further, the use of the length of the external software module for computing the check value is to prevent length extension attacks.

In embodiments, to hack the system-on-a-chip, a hacker must be able to generate a software module having the same length of an authenticated external module and for which the system-on-a-chip can generate a final check value equal to an expected value for the authenticated external module. The probability of successfully developing such a software module is low.

In embodiments, each modified software module is computed by a non-linear function. The use of a non-linear function guarantees a high degree of independence between two modified software modules generated consecutively. Thus, it increases the robustness of the method.

Alternatively, each modified software module can be computed by a linear function.

Advantageously, the expected value is stored in configuration bits of the system-on-a-chip or is coded at a register-transfer level.

In embodiments, a system-on-a-chip is proposed. The system-on-a-chip includes: a memory configured to store an external software module, computation circuit configured to compute several modified software modules from the external software module, compute check values by iteration until obtaining a final check value—each check value being computed at least from a given modified software module and a check value previously computed, starting with a predefined initial check value. The system-on-a-chip further includes a comparison circuit configured to compare the final check value to an expected value stored in the system-on-a-chip, and a validation circuit configured to validate the external software module when the final check value is equal to the expected value.

In embodiments, the memory is a volatile memory.

In embodiments, the system-on-a-chip includes a processor to implement the comparison circuit and the validation circuit.

In embodiments, the computation circuit includes a cyclic redundancy check circuit for computing each check value.

In embodiments, the computation circuit includes a hash circuit for computing each check value.

In embodiments, the computation circuit is configured to compute each check value by using a length of the external software module.

In embodiments, the computation circuit includes a non-linear function circuit configured to compute each modified software module by a non-linear function.

In embodiments, the non-linear function includes a shifting of bits of the modified software module.

In embodiments, the expected value is stored in configuration bits or is coded at a register-transfer level.

In embodiments, several expected values are stored in the system-on-a-chip.

The different predefined expected values can be used to validate different external software modules that can provide different additional services to the system-on-a-chip.

BRIEF DESCRIPTION OF THE DRAWINGS

For a more complete understanding of the present disclosure and the advantages thereof, reference is now made to the following descriptions taken in conjunction with the accompanying drawings, in which.

DETAILED DESCRIPTION OF ILLUSTRATIVE EMBODIMENTS

Figure 1:
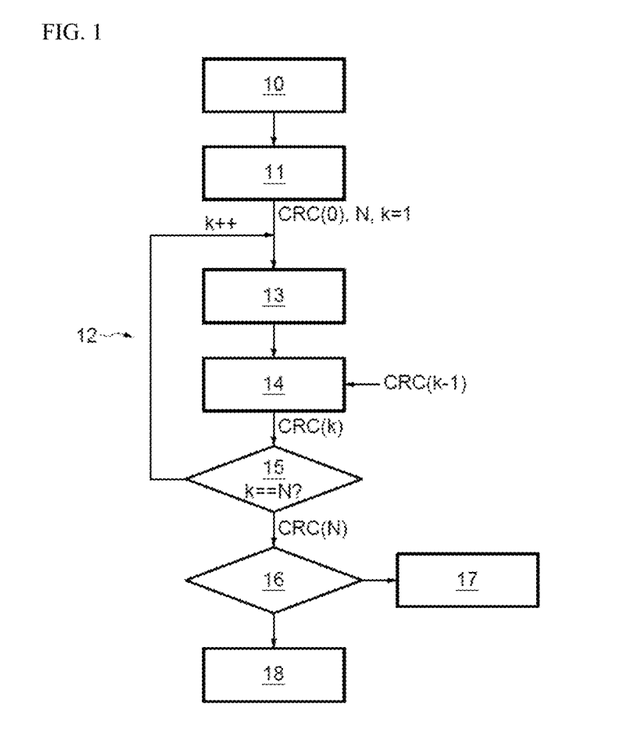
FIG. 1 is a flow diagram of an embodiment method for validating an external software module.

FIG. 1 shows a method for validating an external software module received by a system-on-a-chip for its use by the system-on-a-chip, which is implemented by the system-on-a-chip. The external software module can be a software module providing additional services to the system-on-a-chip. In embodiments, each external software module that the system-on-a-chip can use is defined by the manufacturer of the system-on-a-chip.

The system-on-a-chip is configured to compute several check values CRC(k) from the external software module, where k is an integer number from 1 to N. Thus, the system-on-a-chip is configured to compute several check values CRC(k), starting with a first check value CRC(1) to a final check value CRC(N). Check values are computed from modified software modules derived from the external software module received by the system-on-a-chip.

The system-on-a-chip is configured to validate the external software module according to the final check value CRC(N) computed. In embodiments, if the final check value CRC(N) is equal to an expected value defined by the manufacturer, the external software module is validated.

In embodiments, the number N is chosen to lower the probability of obtaining the same final check value for two different external software modules. The higher the value of N, the lower the probability of obtaining the same final check value for two different software modules. In embodiments, the number N is chosen to minimize the computation time of the final check value. In embodiments, the number N is greater than 10. In embodiments, the number N is between 15 and 20.

As shown in FIG. 1, the method includes an obtention 10 of the external software module by the system-on-a-chip.

Next, the method includes an initialization step 11 in which the value k is initialized to 1, and an initial check value CRC(0) and a number N of check values to compute are defined. The initial check value CRC(0) can be any value. In embodiments, the initial check value is defined randomly.

The method includes a loop 12 to compute check values from different modified software modules. In embodiments, the loop includes step 13 in which a modified software module is computed from the external software module using a non-linear function.

In embodiments, the modified software module is expressed as SW_module #(k)=F[SW_module #(k−1)], where SW_module #(k) is the modified software module to be computed, SW_module #(k−1) is the external software module when k is equal to 1 or the last computed modified software module when k is greater than or equal to 2, and F is a non-linear function.

In some embodiments, the modified software module is expressed as SW_module #(k)=Fk[ESW_module], where SW_module #(k) is the modified software module to be computed, ESW_module is the external software module, and Fk is a non-linear function that depends on k.

In embodiments, the external software module is formed of binary data words that are modified by the non-linear function to obtain modified data words forming the modified software module.

The modified software module is computed from the external software module using a linear function in some embodiments. The function used to compute a modified software module allows obtaining a new modified software module distinct from the last computed modified software module.

Loop 12 includes, at step 14, a computation of a check value CRC(k) from the modified software module, the last computed check value CRC(k−1) or the initial check value CRC(0), and the length (S) of the external software module. The length (S) of the external software module is the number of words composing the external software module. In embodiments, the check value is computed using a cyclic redundancy check algorithm such as a CRC-32 algorithm, a HASH algorithm, or the like.

In embodiments, the check value is computed from a concatenated binary word of the modified software module used to compute the check value, the previous check value, and the length (S) of the external software module.

In embodiments, the check value CRC(k) is expressed as CRC(k)=CRC (SW_module #(k)|CRC(k−1)|S), with k being an integer between 1 to N, where SW_module #(k) is a modified software module, CRC(k−1) is the last computed check value from a previous modified software module SW_module #(k−1) or the initial check value CRC(0), and (S) is the length of the external software module.

At step 15, the number k is compared to the number N. If the number k is smaller than the number N, steps 13 to 15 are repeated to compute a new check value, and the number k is incremented. However, when the number k is equal to N, it means that the last computed check value is the final check value. In this case, the method includes step 16, in which the final check value is compared to the expected value defined by the manufacturer. If the final check value CRC(N) is different from the expected value defined by the manufacturer, the external software module is rejected at step 17. If the final check value CRC(N) is equal to the expected value defined by the manufacturer, the external software module is validated at step 18. Once validated, the external software module can be used by the system-on-a-chip.

Advantageously, the use of the previous check value CRC(k−1) to compute a new check value guarantees a chaining effect to the computation of each check value. Further, the use of the length (S) of the external software module for computing the check value adds more robustness to the method. Advantageously, the use of the length (S) of the external software module for computing the check value prevents length extension attacks.

Generally, to hack the system-on-a-chip, a hacker must be able to generate a software module having the same length of an authenticated external module and for which the system-on-a-chip can generate a final check value equal to an expected value for the authenticated external module.

Figure 2:
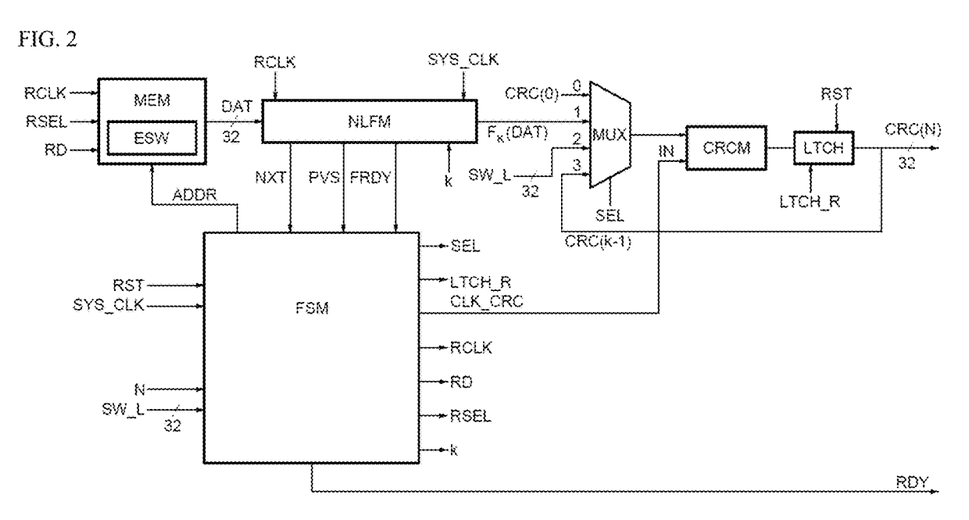
FIG. 2 is a diagram of an embodiment of a portion of system-on-a-chip.

FIG. 2 illustrates an embodiment portion of a system-on-a-chip configured to generate a final check value. The system-on-a-chip includes a finite-state machine circuit (FSM), a volatile memory storage (MEM), a non-linear function circuit (NLFM), a multiplexer (MUX), a cyclic redundancy check circuit (CRCM), and latches (LTCH).

The volatile memory storage (MEM) is configured to store the external software module (ESW) or program. The volatile memory storage (MEM) can be a RAM ("Random Access Memory").

The finite-state machine circuit (FSM) includes different inputs and outputs. A first input is configured to receive a reset signal (RST). The reset signal (RST) is used to reset the finite-state machine circuit (FSM).

A second input is configured to receive a system clock signal (SYS_CLK). The finite-state machine circuit (FSM) operates according to the system clock signal (SYS_CLK).

The finite-state machine circuit (FSM) also includes an output configured to emit a clock signal (RCLK) to an input of the volatile memory storage (MEM). The clock signal (RCLK) is generated by the finite-state machine circuit (FSM).

The finite-state machine circuit (FSM) also includes an output configured to emit a signal (RSEL) to another input of the volatile memory storage (MEM). The signal (RSEL) is used to select the volatile memory storage (MEM).

The finite-state machine circuit (FSM) also includes an output configured to emit a read signal (RD) to another input of the volatile memory storage (MEM). The read signal (RD) is used to instruct a reading of the volatile memory storage (MEM).

The finite-state machine circuit (FSM) further includes an output to deliver an address signal (ADDR) to another input of the volatile memory storage (MEM). The address signal (ADDR) is an address of data words of the external software module (ESW) in the volatile memory storage (MEM).

An input of the finite-state machine circuit (FSM) is configured to receive the number N of check values to be generated to obtain the final check value.

The finite-state machine circuit (FSM) further includes an input configured to receive a signal (NXT) from an output of the non-linear function circuit (NLFM).

The finite-state machine circuit (FSM) also includes an input configured to receive a signal (PVS) from an output of the non-linear function circuit (NLFM).

The finite-state machine circuit (FSM) further includes an input configured to receive a signal (FRDY) from an output of the non-linear function circuit (NLFM).

The finite-state machine circuit (FSM) also includes an output configured to deliver a number k at the input of the non-linear function circuit (NLFM). The finite-state machine circuit (FSM) is configured to increment the number k after each computation of a check value.

In embodiments, the finite-state machine circuit (FSM) is configured to initialize the number k to 1 to compute a first check value CRC(1).

The finite-state machine circuit (FSM) includes an output configured to emit a signal (SEL) to the multiplexer (MUX).

Another output of the finite-state machine circuit (FSM) is configured to pulse a signal (LTCH_R) that is delivered to the latches (LTCH).

An output of the finite-state machine circuit (FSM) is configured to emit a signal (CLK_CRC) to the cyclic redundancy check circuit (CRCM).

Another input of the finite-state machine circuit (FSM) is configured to receive a signal (SW_L) corresponding to the length (S) of the external software module (ESW).

The finite-state machine circuit (FSM) includes an output configured to emit a signal (RDY) to the processor when the final check value has been computed.

The finite-state machine circuit (FSM) is configured to implement a method for computing a final check value CRC(N).

The non-linear function circuit (NLFM) is configured to transform each data word (DAT) of the external software module (ESW) into a modified data word Fk(DAT). By doing this, the non-linear function circuit (NLFM) is configured to generate a modified software module formed by each modified data word Fk(DAT) generated from the data words (DAT) of the external software module (ESW).

In embodiments, the system-on-a-chip is configured so that each modified software module is generated by the non-linear function circuit (NLFM) directly from the external software module (ESW).

In embodiments, the non-linear function circuit (NLFM) is configured to implement a non-linear function. The non-linear function depends on the number k generated by the finite-state machine circuit (FSM) to generate a different modified software module for each iteration of k. The non-linear function can consist of shifting the bits of the data word (DAT) of the external software module (ESW) received at the input of the non-linear function circuit (NLFM).

For example, the non-linear function can be expressed as Fk(DAT)=DAT<<k with Fk(DAT)LSB+k−m=not (DATMSB−m), m going from 0 to k−1, where Fk(DAT) is the modified data word computed from the data word (DAT), Fk(DAT)LSB is the least significant bit of the modified data word Fk(DAT) and DATMSB is the most significant bit of the data word (DAT).

The non-linear function can consist of performing an "exclusive or" function between different data words (DAT) of the external software module (ESW). For example, the non-linear function can be expressed as: Fk[DAT(ADDR)] =DAT(ADDR−k) xor DAT(ADDR) xor DAT(ADDR+k), when ADDR≥k and ADDR<ADDR_max−k; Fk[DAT (ADDR)]=DAT(ADDR) xor M, when ADDR<k or ADDR≥ADDR_MAX−k, where Fk[DAT(ADDR)] is the modified data word computed for the data word (DAT) (ADDR) stored at address ADDR, DAT(ADDR−1) is the previous data word in the memory, and DAT(ADDR+1) is the next data word in the memory and ADDR_MAX is the maximal data word address of the software module used to compute the new modified software module, the address ADDR being between 0 to the address ADDR_MAX, ADDR_MAX being equal to the length (S) of the external software module and M being a constant, for example, 0xA5.

The non-linear function circuit (NLFM) includes outputs to deliver the signal (NXT), the signal (PVS), and the signal (FRDY) to the finite-state machine circuit (FSM). The non-linear function circuit (NLFM) uses the signal (PVS) to request to the finite-state machine circuit (FSM) the data word stored in the volatile memory storage (MEM) stored at a previous address ADDR−k from an address ADDR of the data word (DAT).

The non-linear function circuit (NLFM) uses the signal (NXT) to request to the finite-state machine circuit (FSM) the data word (DAT) stored in the volatile memory storage (MEM) stored at a next address ADDR+k from an address ADDR of the data word (DAT).

The non-linear function circuit (NLFM) uses the signal (FRDY) to indicate to the finite-state machine circuit (FSM) that the computed modified data word Fk(DAT) is available.

The non-linear function circuit (NLFM) also includes an output to deliver the modified data word Fk(DAT) to the multiplexer (MUX).

The multiplexer (MUX) includes different inputs to receive a signal CRC(0), the modified data word Fk(DAT), the length (SW_L) of the external software module (ESW), and the last computed check value CRC(k−1).

The multiplexer (MUX) also includes an output connected to an input of the cyclic redundancy check circuit (CRCM).

The multiplexer (MUX) also includes an input to receive the signal (SEL) from the finite-state machine circuit (FSM). The signal (SEL) allows selecting the input of the multiplexer (MUX) to deliver at the output of the multiplexer (MUX).

The cyclic redundancy check circuit (CRCM) is configured to compute a check value CRC(k). In embodiments, the check value CRC(k) is computed from the modified data word Fk(DAT) computed by the non-linear function circuit (NLFM), from the last computed check value or an initial check value and the length (SW_L) of the external software module (ESW).

In embodiments, the modified data word Fk(DAT), the last check value CRC(k−1) or the initial check value CRC (0), and the length (SW_L) of the external software module (ESW) are provided to the cyclic redundancy check circuit (CRCM) by the multiplexer (MUX) controlled by the finite-state machine circuit (FSM). In embodiments, the cyclic redundancy check circuit (CRCM) can perform a CRC-32 algorithm.

The cyclic redundancy check circuit (CRCM) includes an input to receive the signal (CLK_CRC) generated by the finite-state machine circuit (FSM).

The cyclic redundancy check circuit (CRCM) includes an output to deliver the check value to an input of the latches (LTCH).

The cyclic redundancy check circuit (CRCM) is used to compute a number of check values equal to the number N received at an input of the finite-state machine circuit (FSM). The Nth check value is the final check value.

The latches (LTCH) are used to store temporarily each check value computed by the cyclic redundancy check circuit (CRCM).

The latches (LTCH) also include an input to receive the signal (LTCH_R) from the finite-state machine circuit (FSM).

The latches (LTCH) include an output to deliver the last computed check value by the cyclic redundancy check circuit (CRCM) when the signal (LTCH_R) is asserted by the finite-state machine circuit (FSM).

The output of the latches (LTCH) is connected to an input of the multiplexer (MUX) to deliver the signal CRC(k−1).

The output of the latches (LTCH) is also connected to a processor.

Thus, latches (LTCH) are used to deliver the last computed check value CRC(k−1) to the multiplexer (MUX) for the computation of another check value CRC(k) by the cyclic redundancy check circuit (CRCM).

Following the final check value CRC(N) computation, the latches (LTCH) are configured to store this final check value before delivering it to the processor. When the final check value is available to the processor, the finite-state machine circuit (FSM) is configured to assert the signal (RDY).

When the signal (RDY) is asserted, the processor is configured to receive the final check value. Then, the processor is configured to compare the final check value to a predefined expected value. The expected value is defined by the manufacturer of the system-on-a-chip from an authorized external software module (ESW). In embodiments, the expected value is stored in the system-on-a-chip. For example, the expected value can be stored in configuration bits or register-transfer level (RTL) coded.

If the final check value is equal to the expected value, it means that the probability that the external software module (ESW) provided to the system-on-a-chip is an authorized software module is high. In this case, the processor is configured to validate the external software module (ESW). Then, the external software module (ESW) can be used by the system-on-a-chip.

Otherwise, if the final check value is not equal to the expected value, it means that the external software module (ESW) provided to the system-on-a-chip is not an authorized software module. In this case, the processor is configured to reject the external software module (ESW). Thus, in this case, the external software module (ESW) cannot be used by the system-on-a-chip.

Figure 3:
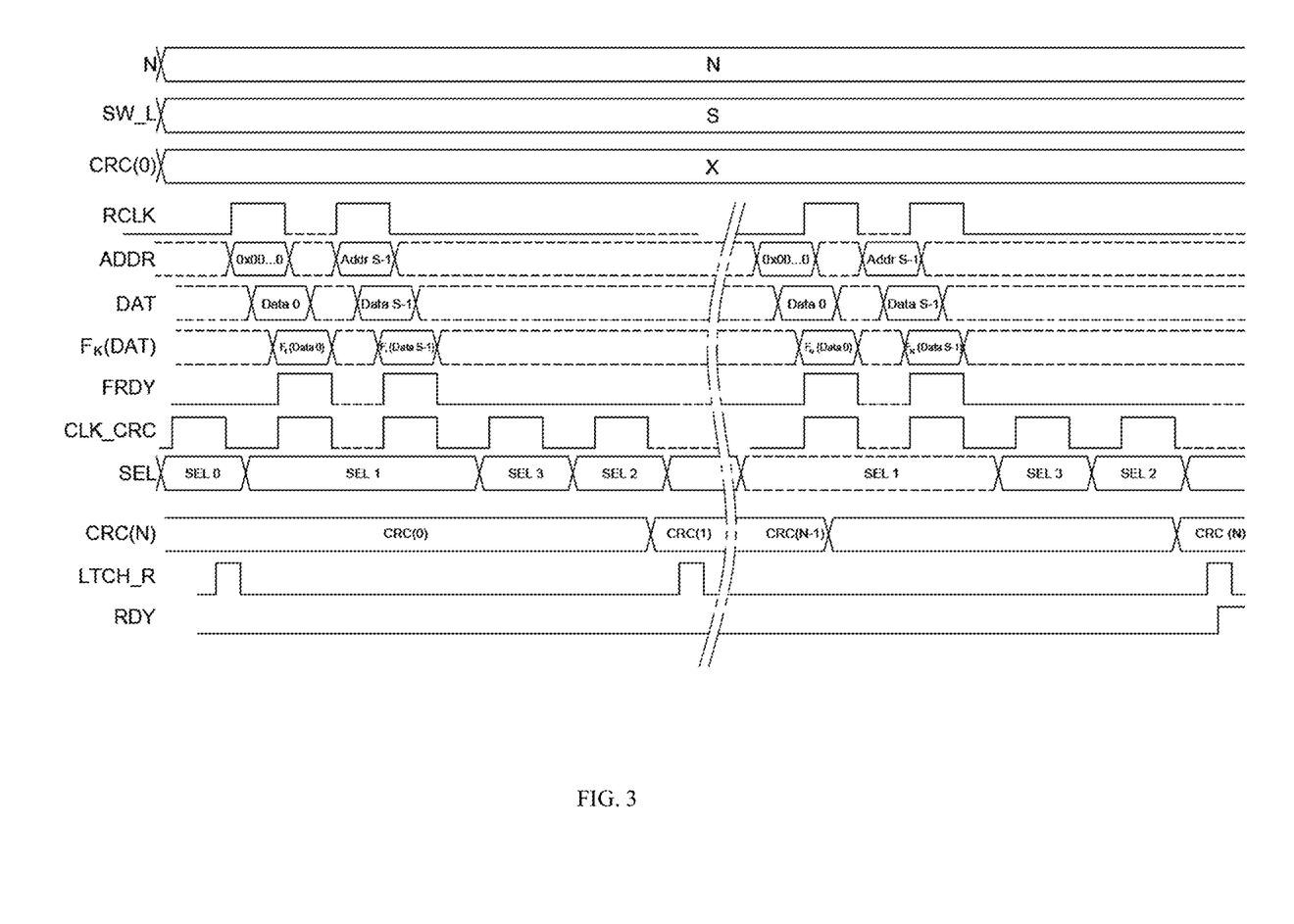
FIG. 3 is a timing diagram of an embodiment for obtaining a final check value.

FIG. 3 shows an example of a timeline of the signals used by the different elements of the system-on-a-chip of FIG. 1 for obtaining the final check value CRC(N). Initially, the external software module (ESW) to be validated is stored in the volatile memory storage (MEM). In embodiments, the external software module (ESW) is divided into several data words stored in the memory at different addresses. In an embodiment, each data word includes 32 bits.

The length (S) of the external software module (ESW) is received by the finite-state machine circuit (FSM) via the signal (SW_L). The number N of check values to compute is also received by the finite-state machine circuit (FSM).

In an initialization step, the finite-state machine circuit (FSM) selects, with the signal (SEL), the input of the multiplexer (MUX) that receives the initial check value CRC(0), which can be RTL coded. For example, the finite-state machine circuit (FSM) selects the input no 0 of the multiplexer with a value "Sel 0" of signal (SEL). The initial check value CRC(0) can be equal to any value X.

The clock signal (CLK_CRC) is pulsed to provide the initial check value to the cyclic redundancy check circuit (CRCM). The finite-state machine circuit (FSM) pulses the signal (LTCH_R) to store the signal CRC(0) in latches (LTCH). This initial check value is used to compute the first check value CRC(1).

A modified data word Fk(DAT) for each word of the external software module (ESW) is computed to compute a check value.

In embodiments, the finite-state machine circuit (FSM) delivers the address of the data word (DAT) to the volatile memory storage (MEM). The finite-state machine circuit (FSM) also pulses the signal (RD) to instruct the reading of the volatile memory storage (MEM) of the data word (DAT) stored at the address delivered by the finite-state machine circuit (FSM). In embodiments, the reading of the data word (DAT) starts on a rising edge of the clock signal (RCLK).

The finite-state machine circuit (FSM) also asserts the signal (RSEL) to select the volatile memory storage (MEM).

Further, the finite-state machine circuit (FSM) selects, with the signal (SEL), the input of the multiplexer (MUX) that receives the modified data word Fk(DAT). For example, the finite-state machine circuit (FSM) selects the input no 1 of the multiplexer with a value "Sel 1" of signal (SEL).

The data word (DAT) is delivered by the volatile memory storage (MEM) to the non-linear function circuit (NLFM). Next, the non-linear function circuit (NLFM) computes the modified data word Fk(DAT) from the data word (DAT) delivered by the volatile memory storage (MEM). In embodiments, the computation of the modified data word Fk(DAT) is performed according to the system clock signal (SYS_CLK).

In case the non-linear function circuit (NLFM) needs a previous data word, or a next data word of the external software module (ESW), to compute the modified data word Fk(DAT), the non-linear function circuit (NLFM) asserts the signal (PVS) or the signal (NXT).

When the finite-state machine circuit (FSM) receives the signal (PVS) or the signal (NXT), the finite-state machine circuit (FSM) requests the reading of the data word stored at the previous or the next address of the volatile memory storage (MEM). Then, the data word stored at the previous or the next address is delivered to the non-linear function circuit (NLFM).

When the computation of a modified data word Fk(DAT) ends, the non-linear function circuit (NLFM) asserts the signal (FRDY) to indicate to the finite-state machine circuit (FSM) that the modified data word Fk(DAT) is available.

The finite-state machine circuit (FSM) pulses the clock signal (CLK_CRC) to deliver the modified data word Fk(DAT) to the cyclic redundancy check circuit (CRCM). When a modified data word Fk(DAT) has been computed for each data word (DAT) of the external software module (ESW), a modified software module is obtained.

For example, in FIG. 3, the non-linear function circuit does not need a previous data word or a next data word of the external software module. The modified data word F1(Data 0) is computed from the data word (DAT)a 0 stored at the address 0x00 . . . 0 of the volatile memory, with k being equal to 1. The modified data word F1(Data S-1) is computed from the data word (DAT)a S-1 stored at the address ADDR S-1 of the volatile memory, with k being equal to 1. Modified data words F1(Data 0) to F1(Data S-1) form a first modified software module.

The modified data word FN(Data 0) is computed from the data word (DAT)a 0 stored at the address 0x00 . . . 0 of the volatile memory, with k being equal to N. The modified data word FN(Data S-1) is computed from the data word (DAT)a S-1 stored at the address ADDR S-1 of the volatile memory, with k being equal to N. Modified data words FN(Data 0) to FN(Data S-1) form a final modified software module.

To proceed with the computation of a check value, when all modified data words Fk(DAT) (i.e., the modified software module) have been delivered to the cyclic redundancy check circuit (CRCM), the finite-state machine circuit (FSM) selects the input of the multiplexer (MUX) that receives the last computed check value CRC(k-1) or the initial check value CRC(0). For example, the finite-state machine circuit (FSM) selects the input no 3 of the multiplexer with a value "Sel 3" of signal (SEL).

The clock signal (CLK_CRC) is pulsed by the finite-state machine circuit (FSM). This allows delivering the last computed check value CRC(k-1) or the initial check value CRC(0) to the cyclic redundancy check circuit (CRCM) for the computation of a new check value.

The finite-state machine circuit (FSM) selects the input of the multiplexer (MUX) that receives the software length (S) via the signal (SW_L). For example, the finite-state machine circuit (FSM) selects the input no 2 of the multiplexer with a value "Sel 2" of signal (SEL).

The clock signal (CLK_CRC) is pulsed by the finite-state machine circuit (FSM), which allows delivering the software length (S) to the cyclic redundancy check circuit (CRCM) to compute a new check value.

The new check value is computed by the cyclic redundancy check circuit (CRCM) using all the computed modified data words Fk(DAT), the last computed check value CRC(k-1) or the initial check value CRC(0), and the software length (S).

For example, the first check value CRC(1) is computed from modified data words F1(Data 0) to F1(Data S-1) of the first modified software module, and also from the initial check value CRC(0) and the length (S) of the external software module.

The finite-state machine circuit (FSM) pulses the signal (LTCH_R) to store the new check value in latches (LTCH). Check values are computed until obtaining a final check value CRC(N).

For example, the final check value CRC(N) is computed from modified data words FN(Data 0) to FN(Data S-1) of the final modified software module, and also from the previous check value CRC(N-1) and the length (S) of the external software module.

When the final check value has been computed, the finite-state machine circuit (FSM) pulses the signal (LTCH_R) to store the final check value in latches (LTCH). The finite-state machine circuit (FSM) pulses the signal (RDY) to deliver the final check value CRC(N) to the processor. The processor uses the final check value to validate the external software module (ESW).

In embodiments, the processor compares the final check value to a predefined expected value. If the final check value is equal to the expected value, the processor validates the external software module (ESW), and the external software module (ESW) can be used by the system-on-a-chip. Otherwise, if the final check value is not equal to the expected value, the processor rejects the external software module (ESW), and the external software module (ESW) cannot be used by the system-on-a-chip.

Figure 4:
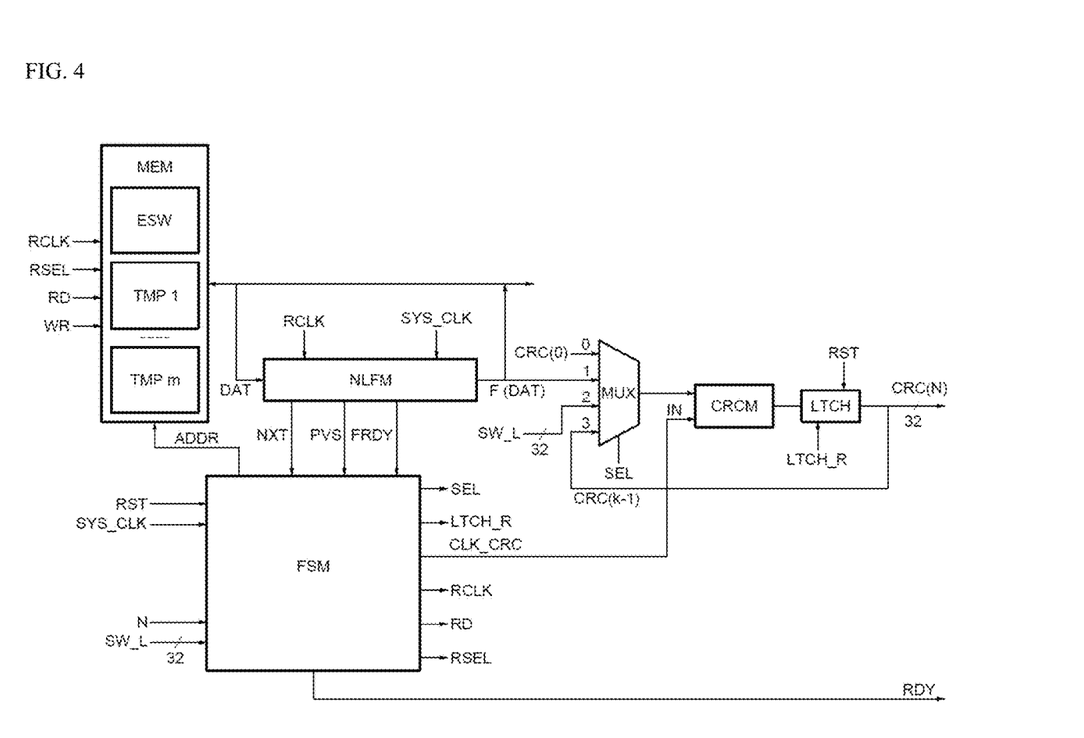
FIG. 4 is a diagram of an embodiment of a portion of system-on-a-chip.

FIG. 4 illustrates an embodiment of a part of a system-on-a-chip configured to generate a final check value. The system-on-a-chip from FIG. 4 provides another method to generate a modified software module by the non-linear function circuit (NLFM) in comparison to the system-on-a-chip of FIG. 2.

In embodiments, the non-linear function circuit (NLFM) is configured to apply exactly the same non-linear function to each data word (DAT) received at the input of the non-linear function circuit (NLFM). Thus, the non-linear function does not depend on a number k.

However, the system-on-a-chip is configured so that each modified software module is generated by the non-linear function circuit (NLFM) directly from a modified software module, the first modified software module being generated from the external software module.

In embodiments, the volatile memory storage (MEM) is configured to store each modified software module. For example, modified software modules can be stored in the memory banks TMP1 to TMPm.

Besides, the non-linear function circuit (NLFM) is configured to receive data words (DAT) of the external software module (ESW) or data words (DAT) of modified software modules stored in the volatile memory storage (MEM). The non-linear function circuit (NLFM) is configured to compute a modified data word F(DAT) from each data word (DAT) received at its input.

In embodiments, the finite-state machine circuit (FSM) is configured to select the data word (DAT) of the external software module (ESW) or a modified software module to be delivered to the non-linear function circuit (NLFM).

The modified data words F(DAT) obtained from data words (DAT) of the external software module (ESW) or a given modified software module form a new modified software module.

The non-linear function circuit (NLFM) is configured to deliver each modified data word F(DAT) of a new modified software module to the volatile memory storage (MEM). The non-linear function circuit (NLFM) is also configured to assert a signal WR to instruct writing of a newly computed modified data word F(DAT). The non-linear function can consist of shifting the bits of the data word (DAT) of the external software module (ESW) or a modified software module received at the input of the non-linear function circuit (NLFM).

For example, the non-linear function can be expressed as F(DAT)=DAT<<1 with F(DAT)$_{LSB}$=not (DAT$_{MSB}$), where F(DAT) is the modified data word computed from the data word (DAT), F(DAT)$_{LSB}$ is the least significant bit of the modified data word F(DAT) and DAT$_{MSB}$ is the most significant bit of the data word (DAT).

In embodiments, the non-linear function consists of performing an "exclusive or" function between different data words.

For example, in such case, the non-linear function can be expressed as F[DAT(ADDR)]=DAT(ADDR−1) xor DAT(ADDR) xor DAT(ADDR+1), when ADDR>1 and ADDR<ADDR_MAX−1, F[DAT(ADDR)]=DAT(ADDR) xor M, when ADDR=0 or ADDR=ADDR_MAX, where F[DAT(ADDR)] is the modified data word computed for the data word (DAT)(ADDR) stored at address ADDR, DAT(ADDR−1) is the previous data word in the memory, and DAT(ADDR+1) is the next data word in the memory and ADDR_MAX is the maximal data word address of the software module used to compute the new modified software module, the address ADDR being between 0 to the address ADDR_MAX, ADDR_MAX being equal to the length of the external software module and M being a constant, for example, 0xA5.

Otherwise, each check value is computed in the same way as in the embodiment of FIG. 1.

In embodiments, each modified software module stored in the memory can be overwritten by a newly computed modified software module when the modified software module stored in the memory is no longer needed for the computation of a new modified software module. This allows minimizing the amount of memory necessary to store software modules.

In embodiments, some system-on-a-chip may store different predefined expected values so as to validate different external software modules that can provide different additional services to the system-on-a-chip. Thus, for each external software module that can be allowed to be used by the system-on-a-chip, a predefined expected value is stored in the system-on-a-chip.

For example, a first expected value can be defined to validate an external software module that can be used to perform a HMAC-SHA256 function. A second expected value can be defined to validate an external software module that can be used to perform an AES function. A third expected value can be defined to validate an external software module that can be used to authorize an additional external software module chosen by a user of the system-on-a-chip.

The present disclosure is susceptible to various variations and modifications that will be apparent to those skilled in the art. For example, each check value can be computed in different ways than those described above.

In embodiments, each check value can be computed from a modified software module computed by the non-linear function circuit, and from a result of a secondary function module taking as inputs the last computed check value and the length of external the software module.

Alternatively, each check value can be computed from a modified software module computed by the non-linear function circuit and from a result of a secondary function module taking as inputs the several already computed check values and the length of the external software module.

Although the description has been described in detail, it should be understood that various changes, substitutions, and alterations may be made without departing from the spirit and scope of this disclosure as defined by the appended claims. The same elements are designated with the same reference numbers in the various figures. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

The specification and drawings are, accordingly, to be regarded simply as an illustration of the disclosure as defined by the appended claims, and are contemplated to cover any and all modifications, variations, combinations, or equivalents that fall within the scope of the present disclosure.

What is claimed is:
1. A method, comprising:
obtaining an external software module intended for use by a system-on-a-chip;

computing several modified software modules from an entirety of the external software module;

computing an iterative check value iteratively computed from an initial predefined check value to a final check value, each iterative check value, after the initial predefined check value, computed from one or more of the modified software modules and a previously-computed check value;

comparing the final check value to an expected value stored in the system-on-a-chip; and validating the external software module for use by the system-on-a-chip in response to the final check value being equal to the expected value.

2. The method of claim 1, wherein computing the iterative check value comprises computing each check value using a cyclic redundancy check algorithm.

3. The method of claim 1, wherein computing the iterative check value comprises computing each check value using a hash algorithm.

4. The method of claim 1, wherein computing the iterative check value comprises computing each check value using a length of the external software module.

5. The method of claim 1, wherein computing the several modified software modules comprises using a non-linear function.

6. The method of claim 5, wherein the non-linear function comprises shifting of bits of a corresponding modified software module.

7. The method of claim 1, wherein the expected value stored in the system-on-a-chip comprises the expected value being stored in configuration bits of the system-on-a-chip or being coded at a register-transfer level.

8. A system-on-a-chip, comprising:
a memory storage configured to store an external software module;
a computation circuit configured to:
compute several modified software modules from an entirety of the external software module;
compute an iterative check value iteratively computed from an initial predefined check value to a final check value, each iterative check value, after the initial predefined check value, computed from one or more of the modified software modules and a previously-computed check value;
a comparison circuit configured to compare the final check value to an expected value stored in the system-on-a-chip; and
a validation circuit configured to validate the external software module for use by the system-on-a-chip in response to the final check value being equal to the expected value.

9. The system-on-a-chip of claim 8, wherein the computation circuit comprises a cyclic redundancy check circuit configured to compute the iterative check value.

10. The system-on-a-chip of claim 8, wherein the computation circuit comprises a hash circuit configured to compute the iterative check value.

11. The system-on-a-chip of claim 8, wherein the computation circuit is configured to compute each iterative check value using a length of the external software module.

12. The system-on-a-chip of claim 8, wherein the computation circuit comprises a non-linear function circuit configured to compute the several modified software modules using a non-linear function.

13. The system-on-a-chip of claim 12, wherein the non-linear function comprises shifting of bits of a corresponding modified software module.

14. The system-on-a-chip of claim 8, wherein the expected value is stored in configuration bits of the system-on-a-chip or is coded at a register-transfer level.

15. The system-on-a-chip of claim 8, wherein the memory storage is configured to store further external software modules.

16. A device comprising a system-on-a-chip, the system-on-a-chip comprising:
a memory storage configured to store an external software module;
a computation circuit configured to:
compute several modified software modules from an entirety of the external software module;
compute an iterative check value iteratively computed from an initial predefined check value to a final check value, each iterative check value, after the initial predefined check value, computed from one or more of the modified software modules and a previously-computed check value;
a comparison circuit configured to compare the final check value to an expected value stored in the system-on-a-chip; and
a validation circuit configured to validate the external software module for use by the system-on-a-chip in response to the final check value being equal to the expected value.

17. The device of claim 16, wherein the computation circuit comprises a cyclic redundancy check circuit configured to compute the iterative check value.

18. The device of claim 16, wherein the computation circuit comprises a hash circuit configured to compute the iterative check value.

19. The device of claim 16, wherein the computation circuit is configured to compute each iterative check value using a length of the external software module.

20. The device of claim 16, wherein the computation circuit comprises a non-linear function circuit configured to compute the several modified software modules using a non-linear function.

* * * * *